United States Patent Office 2,740,806
Patented Apr. 3, 1956

2,740,806

NUCLEARLY HYDROXYLATED DERIVATIVES OF α,β-DIPHENYLALKANONITRILES

Kurt J. Rorig, Evanston, Ill., assignor, by mesne assignments, to G. D. Searle & Co., Skokie, Ill., a corporation of Delaware No Drawing. Application January 29, 1953,
Serial No. 334,090

10 Claims. (Cl. 260—465)

The present invention relates to a new group of organic nitriles and particularly to α,β-diphenylalkanonitriles substituted on each of the phenyl nuclei by at least one hydroxy radical. The compounds which constitute this invention can be represented by the general structural formula

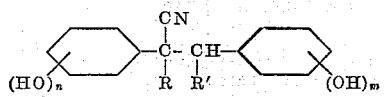

wherein small $n$ and $m$ are one or two and R and R' are either hydrogen or lower alkyl radicals.

The nitriles of my invention have a number of unusual and unexpected properties which make them of great value in therapeutics and particularly in cardiovascular disease and adrenocortical dysfunction. These nitriles have a pronounced depressor effect in acute and chronic hypertension. They possess some of the properties of the naturally occurring adrenal steroid hormones of the glucocorticoid type but lack some of the undesirable side effects which limit the utility of the steroid hormones. Specifically the nitriles of my invention produce neoglycogenesis and inhibit the hypertensive actions of the mineralocorticoid steroid hormone, desoxycorticosterone. In this high order of potency these hydroxy compounds differ fundamentally from their methyl ethers. While the literature indicates that these methyl ethers are active estrogens, the compounds of my present invention show no estrogenic effects even in massive doses. This lack of estrogenic side action is of particular importance for the long continued use of these drugs.

The compounds of my invention are also valuable as intermediates in the organic synthesis of the α,β-bis-(polyhydroxyarlyalkanamides of my co-pending application, Ser. No. 228,999, filed May 29, 1951, issued January 19, 1954, as U. S. Patent 2,666,789, as well as of the α,β-bis(polyhydroxyaryl)alkanones of my co-pending application, Ser. No. 320,616, filed November 14, 1952.

Reduction of the claimed nitriles with lithium aluminum hydride yields the hydroxylated β,γ-diphenylalkanamines of the structural formula

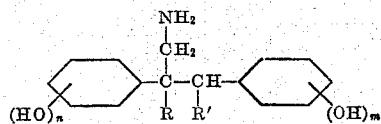

In the form of their water-soluble salts these compounds are useful hormonal agents.

The examples below illustrate in detail some of the compounds which comprise this invention and methods for their synthesis. However, this invention is not to be construed as limited thereby in spirit or in scope. In these examples, temperatures are given uncorrected in degrees centigrade (° C.), relative amounts of materials in parts by weight and pressures in millimeters (mm.) of mercury.

Example 1

A solution of 265 parts of α,β-bis(p-methoxy-phenyl)-acrylonitrile in 1600 parts of freshly distilled acetone is heated to boiling, treated with 2000 parts of Raney nickel and filtered. The filtrate is treated with 50 parts of a 5% palladium-on-charcoal catalyst and hydrogenated in a Parr bomb with 80 pounds of hydrogen in the course of 45 minutes. The contents of the bomb are filtered and the filtrate is evaporated to yield white crystals of α,β-bis(p-methoxyphenyl)propionitrile which, recrystallized from benzene, melts at about 120–121° C.

A mixture of 110 parts of this product and 550 parts of freshly distilled pyridine hydrochloride is heated at reflux temperature for 45 minutes, poured into 3000 parts of cold water, chilled and treated with a sufficient amount of hydrochloric acid to lower the pH to 1. The white solid precipitate is collected on a filter and recrytalized from 2-nitropropane. The α,β-bis(p-hydroxyphenyl)propionitrile thus obtained melts at about 197.5–199.5° C.

Example 2

To 2000 parts of a 0.6 normal ethylmagnesium bromide solution in ether are added with stirring, over a 15 minute period, 320 parts of finely powdered α,β-bis(p-methoxyphenyl)acrylonitrile. The solution becomes dark red-brown and the exothermic reaction continues at reflux temperature for one hour. After stirring and refluxing for three additional hours, the product is decomposed by the careful adition of 655 parts of 10% aqueous hydrochloric acid.

The crumbly, crude solid isomer of α,β-bis(p-methoxyphenyl)valeronitrile is collected on a filter. The ethereal fraction of the filtrate is separated, dried briefly over potassium carbonate and evaporated to dryness. The green-brown residual oil is redissolved in 215 parts of absolute ether and refrigerated to give an additional yield of the solid isomer. Recrystallized from absolute ethanol the solid isomer of α,β-bis(p-methyoxyphenyl)valeronitrile melts at about 133–134° C. The combined mother liquors from the ethanol and the ether recrystallization are distilled at about 194–197° C. and 0.5 mm. presure to yield the viscous pale yellow oily isomer of α,β-bis(p-methoxyphenyl)valeronitrile.

A solution of 46 parts of the solid isomer in 186 parts of freshly distilled pyridine hydrochloride is heated to reflux for 45 minutes, after which it is diluted with 1500 parts of cold water and extracted with ether. The ether extract is dried over anhydrous calcium sulfate, decolorized with charcoal, filtered and evaporated to yield a cream colored powder. Recrystallized from 2-nitropropane, the α,β-bis(p-hydroxyphenyl)valeronitrile is obtained in the form of massive rosettes melting at about 216–271° C. The compound has the structural formula

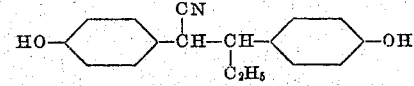

Example 3

A mixture of 29 parts of the oily isomer of α,β-bis(p-methoxyphenyl)valeronitrile, distilled at 194–197° C. and 0.5 mm. pressure, and 120 parts of pyridine hydrochloride is heated to reflux for 45 minutes. The reaction mixture is poured into water and extracted with ether. The ether solution is rapidly extracted with 300 parts of ice cold 4% sodium hydroxide solution and the extract is immediately acidified. The phenolic oil is again extracted with ether, dried, stirred with charcoal and evaporated to yield a brown oil. A 23 part sample of this oil is heated with 550 parts of benzene and the hot benzene is separated from undissolved oil. Upon cooling of the benzene solution there are deposited first a brown oil and then white crystals which melt at about 130–136° C. Upon repeated recrystallization from benzene the lower melting isomer of α,β-bis(p-hydroxphenyl)valeronitrile is obtained in crystals melting at about 138–139° C.

*Example 4*

Over a 15 minute period 66.3 parts of finely powdered α,β-bis(p-methoxyphenyl)acrylonitrile are added to a vigorously stirred refluxing solution of n-propyl-magnesium bromide, prepared from 7.3 parts of magnesium and 37 parts of n-bromopropane in 700 parts of ether. The powdery starting material changes to a light brown oil during the reaction. After 2.5 hours reflux the mixture is homogeneous and dark brown. The reaction is completed by refluxing for 1.5 hours under a nitrogen atmosphere. The reaction mixture is hydrolized with 75 parts of 48% hydrobromic acid and 200 parts of water. The ethereal layer is separated, dried over anhydrous potassium carbonate, filtered and evaporated to yield an oil which is taken up in hot absolute ethanol and cooled to give the solid racemic α,β-bis(p-methoxyphenyl)hexanonitrile, melting at about 122–123° C. The oily residue consisting largely of the lower melting isomer of α,β-bis(p-methoxyphenyl)hexanonitrile is distilled at about 185–187° C. at 0.25 mm. pressure. The infrared absorption spectrum shows maxima at about 4.40, 6.25, 6.63, 6.86, 7.99, 8.48, 9.63 and 11.96 microns.

The solid α,β-bis(p-methoxyphenyl)hexanonitrile is heated at reflux temperature for 40 minutes with 5 parts of freshly distilled pyridine hydrochloride. The reaction mixture is poured into water and extracted with ether. This extract is dried over anhydrous sodium sulfate, filtered and evaporated to yield an oily mixture of stereoisomeric α,β-bis(p-hydroxyphenyl)hexanonitriles. The infrared absorption spectrum shows maxima at 2.88, 6.24, 6.64, 7.96, 8.5 and 11.97 microns. The compound has the structural formula

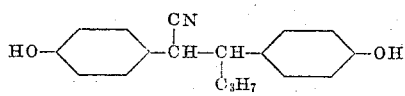

The crystalline, higher melting, racemate is obtained by trituration of the oily α,β-bis(p-hydroxyphenyl)hexanonitrile with 2-nitropropane. On recrystallization from this solvent the product melts at about 165–167° C.

*Example 5*

To 1450 parts of an 0.67 normal ethylmagnesium bromide solution in ether there are added with stirring over a 15 minute period, 265 parts of finely powdered α,β-bis(p-methoxyphenyl)acrylonitrile. The solution becomes dark red-brown and the exothermic reaction continues at reflux temperature for about an hour. At this time the initially formed red oil has become a crystalline yellow powder. After stirring and refluxing for three additional hours with external heating, 180 parts of iodomethane are added dropwise over a 15 minute period. After about ⅔ of the iodomethane have been added the very viscous dark green oil makes stirring difficult. On completion of the iodomethane addition the mixture becomes less viscous and permits stirring under reflux for 90 minutes. The product is decomposed carefully by addition of 145 parts of concentrated hydrochloric acid diluted with 400 parts of water. The ethereal layer is separated from the aqueous layers which still contain some immiscible oil. This is extracted twice with 350 parts portions of ether. The ethereal fractions are combined, dried and distilled at 0.2 mm. pressure. After a forerun of a dark iodine containing oil, a very pale yellow viscous oil is obtained at about 181–184° C. The oil apparently consists of a mixture of all four possible stereoisomeric α-methyl-α,β-bis(p-methoxyphenyl)valeronitriles.

28 parts of this mixture of isomers and 117 parts of pyridine hydrochloride are heated at reflux temperature for an hour, poured into 800 parts of water and extracted with 715 parts of ether. The ether solution is extracted with 300 parts of a 5% aqueous sodium hydroxide solution which is acidified immediately with aqueous hydrochloric acid. This extract is extracted with 100 parts of ether. The ether extract is dried over anhydrous sodium sulfate, stirred with charcoal, filtered and evaporated. The residual oil quickly solidifies to a light yellow solid which recrystallized from 2-nitropropane melts at about 177–178.5° C. The α-methyl-α,β-bis(p-hydroxyphenyl)valeronitrile thus obtained has the structural formula

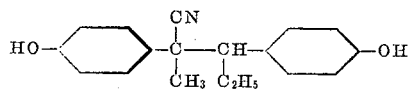

*Example 6*

To a solution of 144 parts of propyl magnesium bromide in 640 parts of absolute ether are added portionwise, in the course of 30 minutes, 76 parts of α,β-bis-(m-methoxyphenyl)acrylonitrile. After refluxing for 4 hours there are added dropwise, in 5 minutes, 73 parts of iodoethane. The mixture is refluxed for one hour and then decomposed with ice and hydrochloric acid. The ethereal layer is separated, dried over anhydrous potassium carbonate and distilled to yield the mixture of two racemic isomers of α-ethyl-α,β-bis(m-methoxyphenyl)-hexanonitrile.

100 parts of the stereoisomeric mixture are refluxed for 30 minutes with 1000 parts of freshly distilled pyridine hydrochloride after which the reaction mixture is poured into 10,000 parts of water, acidified slightly with hydrochloric acid and extracted with ether. This extract is dried over anhydrous sodium sulfate, stirred with charcoal, filtered and evaporated to yield an oil which contains a stereoisomeric mixture of the α-ethyl-bis(m-hydroxyphenyl)hexanonitriles. The infrared absorption spectrum shows maxima at 2.89, 4.39, 6.24, 6.64, 8.0, 8.53 and 12.0 microns. This compound has the structural formula

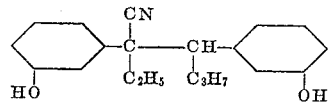

*Example 7*

To a solution of 44 parts of m,p-dimethoxyphenylacetonitrile and 34 parts of p-anisaldehyde in 160 parts of methanol a solution of 13.5 parts of sodium methoxide in 56 parts of methanol is added. The creamy yellow product begins to form at once. After standing for several hours, the α-(m,p-dimethoxyphenyl)-β-(p-methoxyphenyl)acetonitrile is collected on a filter and recrystallized from ethanol in the form of light yellow crystals, which melt at about 131–132° C.

A solution of 141 parts of this product in 880 parts of thiophene-free benzene is treated in the course of 10 minutes at 65° C. with a solution of 69.5 parts of ethylmagnesium bromide in 370 parts of ether. A greenish-yellow, viscous oil forms immediately. The suspension is heated at refluxing temperature for one-half hour, then decomposed by pouring upon ice and dilute sulfuric acid. After thorough stirring the organic layer is dried briefly over anhydrous potassium carbonate and evaporated to yield a brown oil which slowly solidifies on standing. On recrystallization from 95% ethanol a crystalline racemic isomer of α-(m,p-dimethoxyphenyl)-β-(p-methoxyphenyl)valeronitrile is obtained, which melts at about 112.5–114.5° C.

The ethanol is removed by evaporation from the mother liquor from which the solid isomer had been obtained. The residual oil is then distilled to give an approximately equal amount of the other racemic isomer of α-(m,p-dimethoxyphenyl) - β - (p - methoxyphenyl)valeronitrile, which boils at 197–202° C. at 0.5 mm. pressure. On standing, the oil solidifies to a glassy material.

A mixture of 50 parts of the crystalline isomer of α-(m,p - dimethoxyphenyl)-β-(p-methoxyphenyl)valeronitrile, 164 parts of aluminum bromide and 2650 parts of dry thiophene-free benzene is heated at reflux temperature for three hours and then treated with cold water and ether. The organic layer is separated and extracted with 1500 parts of 2-N sodium hydroxide solution. The alkaline solution is immediately acidified with dilute hydrochloric acid and extracted with ether. This ether extract is dried over anhydrous sodium sulfate, stirred with charcoal, filtered and evaporated to yield a brown, phenolic smelling oil. The α-(m,p-dihydroxyphenyl)-β-(p-hydroxyphenyl)valeronitrile shows infrared maxima at 2.88, 4.41, 6.23, 6.64, 7.97 and 8.53 microns.

The oily isomer of α-(m,p-dimethoxyphenyl)-β-(p-methoxyphenyl)valeronitrile is demethylated by the same procedure to yield a phenolic oil with the same infrared spectrum. The compound has the structural formula

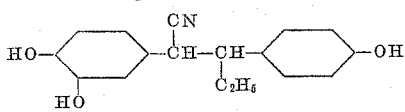

*Example 8*

A solution of 42 parts of the α-(m,p-dihydroxyphenyl)-β-(p-hydroxyphenyl)valeronitrile, obtained by the method of the previous example from the crystalline isomer of the trimethyl ether, is dissolved in 390 parts of pyridine and 216 parts of acetic anhydride and heated for 2½ hours on the steam bath. At a temperature not exceeding 50° C. the reaction mixture is treated with 2500 parts of water and the resulting oil is separated and taken up in ether. The ether solution is washed successively with aqueous hydrobromic acid, sodium hydroxide, hydrobromic acid and water. It is then dried over calcium sulfate, decolorized over charcoal, filtered and evaporated. The residue is taken up in 240 parts of ethanol and, upon dilution with water, crystals are obtained. Recrystallized from ethanol, the α-(m,p-diacetoxyphenyl)-β-(p-acetoxyphenyl)valeronitrile melts at about 119–121° C. It has the structural formula

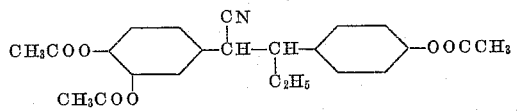

*Example 9*

295 parts of α-(m,p-dimethoxyphenyl)-β-(p-methoxyphenyl)acrylonitrile are dissolved in 2000 parts of benzene at 65° C. and treated in the course of 15 minutes with 570 parts of a 1.4 normal ethereal ethylmagnesium bromide solution and then heated at reflux temperature for 30 minutes. In the course of 15 minutes, 2400 parts of iodomethane are added and refluxing is continued for 6 hours. The reaction mixture is decomposed with dilute hydrochloric acid and filtered to remove a small amount of 1 - (p - methoxyphenyl)-2-(m,p-dimethoxyphenyl)-1-penten-3-one. The filtrate is evaporated and the residue crystallized from ethanol. Crystals are obtained melting at about 95–97° C. The ethanolic mother liquor is evaporated and distilled at about 0.5 mm. pressure and 192–197° C. to yield the lower melting racemic isomer of α - methyl - α - (m,p - dimethoxyphenyl)-β-(p-methoxyphenyl)valeronitrile.

Both isomeric mixtures are demethylated by the following procedure. 50 parts of the α-methyl-α-(m,p-dimethoxyphenyl) - β - (p-methoxyphenyl)valeronitrile are refluxed for 20 minutes with 25 parts of freshly distilled pyridine hydrochloride. The mixture is poured into 400 parts of cold water, acidified slightly with hydrochloric acid and extracted with ether. This extract is dried over anhydrous sodium sulfate, filtered and evaporated to yield the α-methyl - α - (m,p-dihydroxyphenyl)-β-(p-hydroxyphenyl)valeronitrile as an oil. The compound shows infrared maxima at 2.88, 4.40, 6.23, 6.64, 7.98, 8.53 and 12.0 microns, and has the structural formula

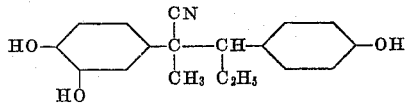

*Example 10*

50 parts of the isomer of α,β-bis(p-hydroxyphenyl)-valeronitrile, melting at 216–217° C., are placed into the thimble of a Soxhlet extraction apparatus. Into the bottom flask are placed 35 parts of lithium aluminum hydride and 4200 parts of absolute ether. The apparatus is heated to reflux until all of the α,β-bis(p-hydroxyphenyl)valeronitrile has been brought into the solution in the lower flask. It is then refluxed for an additional three hours. Then the reaction mixture is treated with just enough aqueous sodium hydroxide to decompose the organometallic product with the formation of ether insoluble lithium and sodium aluminate. From the ethereal layer is obtained the hydrate of α,β-bis(p-hydroxyphenyl)-pentylamine, which melts at about 240–242° C. This melting point depends somewhat on the rate of heating the melting bath. The compound has the structural formula

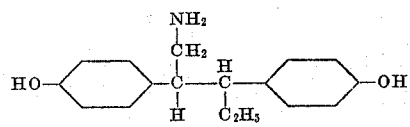

I claim:
1. A nitrile of the structural formula

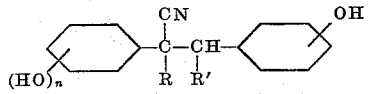

wherein R and R' are members of the class consisting of hydrogen and lower alkyl radicals and *n* is a positive integer less than 3.
2. α,β-Bis(hydroxyphenyl)propionitrile.
3. α,β-Bis(p-hydroxyphenyl)propionitrile.
4. A nitrile of the structural formula

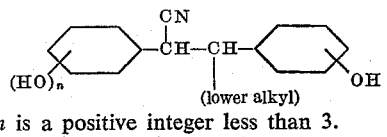

wherein *n* is a positive integer less than 3.
5. A nitrile of the structural formula

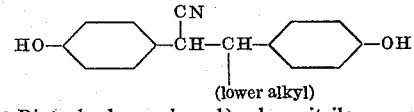

6. α,β-Bis(p-hydroxyphenyl)valeronitrile.
7. α,β-Bis(p-hydroxyphenyl)hexanonitrile.
8. A nitrile of the structural formula

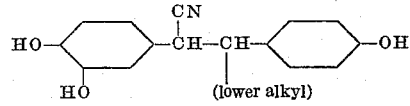

9. A nitrile of the structural formula

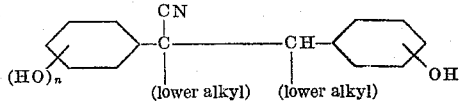

10. An α-methyl-α,β-bis(hydroxyphenyl)valeronitrile.

References Cited in the file of this patent

Skinner: J. Am. Chem. Soc., vol. 62, p. 2882 (1940).
Hunter et al.: J. Am. Chem. Soc., vol. 70, pp. 3424–6 (1948).
Dankova et al.: Chem. Abstracts, vol. 43, pp. 2606–7 (1949).